W. D. LUDLOW.

Stoppering Jars, Cans, &c.

No. 1,477. Reissued May 19, 1863.

Witnesses
G. H. Smith.
L. Bosworth.

Inventor
Jno. H. Griffin
By his attorney
J. V. McIntire

N. PETERS, Photo-Lithographer, Washington, D. C.

UNITED STATES PATENT OFFICE.

JOHN F. GRIFFEN, OF NEW YORK, N. Y., ASSIGNEE OF W. D. LUDLOW, OF SAME PLACE.

IMPROVEMENT IN STOPPING JARS, CANS, &c.

Specification forming part of Letters Patent No. 1,998, dated August 6, 1861; Reissue No. 1,477, dated May 19, 1863.

*To all whom it may concern:*

Be it known that W. D. LUDLOW, of New York city, in the county of New York and State of New York, has invented certain new and useful Improvements in Devices for Stopping Jars, &c., of which the following is hereby declared to be a full and exact description, reference being had to the accompanying drawings, making part of this application, and in which—

Figure 1:
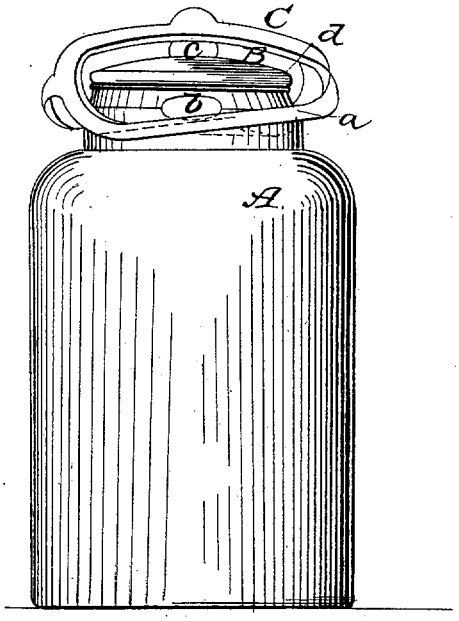
Figure 2:
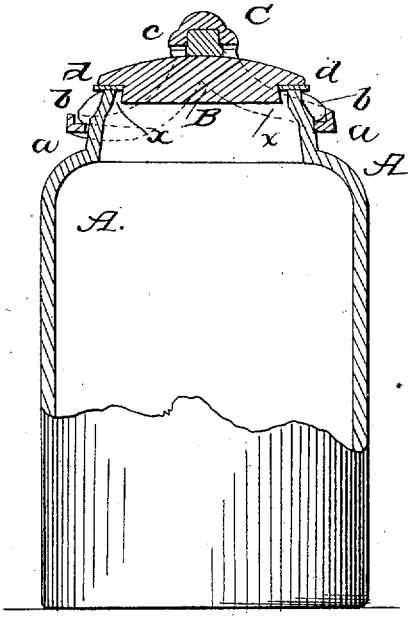
Figure 3:
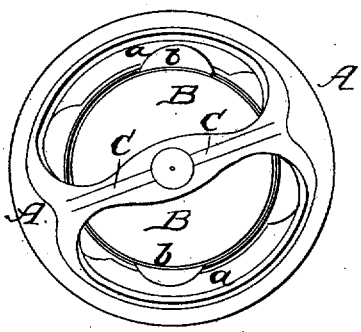

Figure 1 is an elevation of a preserve-jar embracing the invention made the subject of this application. Fig. 2 is a vertical section of the same, showing the lower part of the jar in elevation; and Fig. 3 is a top view of the same.

In the several figures the same parts will be found indicated by the same letters of reference.

The invention relates to that kind of jar-stoppers in which the lid of the jar is clamped down on the top of the jar with a rubber or other packing interposed between the jar's top and the cover or lid, to make a tight joint; and the invention has for its objects to construct the clamping device in such manner and so arrange it with projecting lugs from the sides of the neck of the jar as that the clamping jaws or surfaces will not be liable to spring together and against the neck of the jar during the clamping operation, also to prevent the liability of breaking the lid or cover by a rigid or unequally-divided pressure upon it by the clamping device, whereby I am enabled to employ glass jars and glass tops or lids; and, further, the invention has for its object to so arrange the rubber or other packing with the jar-cover as that the former will be retained on or in connection with the latter without being positively or permanently fastened to it, so that the time requisite for fastening the two together in the manufacture of the article may be saved, and at the same time the packing be retained in connection with the jar-cover, and in such manner that the packing may be practically displaced to admit air and assist the operation of opening or uncovering the jar; and to these ends the invention consists in the employment, in combination with a jar and its cover, of lugs projecting from the exterior of the neck of the jar and a clamping device having inclined flanges operating upon the said lugs, and otherwise so constructed as to obviate any tendency in the clamping surfaces or inclines to press against the neck of the jar, as will be hereinafter more fully explained; and the invention further consists in so constructing the clamping device as that it will exert a slightly yielding or elastic pressure upon the cover of the jar, as will be hereinafter more fully explained; and the invention further consists in so shaping the cover of the jar as that the elastic packing employed in connection with it may be clasped onto it (without being cemented or otherwise fixedly secured to it) and be retained in connection with it, as will be hereinafter fully explained.

In the several figures, A represents a glass jar; B, its top or lid; and *d*, a rubber packing, which is arranged between the cover B and the jar, so as to insure a tight joint. The lid B is formed with a projecting disk-like portion on its under side, which projecting portion is surrounded by the packing-ring *d*. (See Fig. 2.) This portion of the lid B is so shaped, as seen at *x x*, Fig. 2, that the washer *d*, which fits snugly in its place, has to be stretched or strained over the larger portion XX, when it contracts into the position shown, and by its own elasticity is there retained. It will be understood that this method of retaining the packing-ring by its own elasticity on a lid so shaped as to present an enlarged portion over which the packing-ring cannot pass to escape without being more or less distended is much more desirable than the methods heretofore practiced of either cementing the packing-ring to the lid or jar or leaving it disconnected and liable to be lost when the jar is opened or uncovered. The packing *d* should be made a little larger in diameter than the extreme diameter of the lid B, so that its periphery can be taken hold of for the purpose of pulling it out of place to allow the ingress of air to render the removal of the lid easy.

C is the cross-bar of the clamping device, which is formed with an annular rim, as clearly shown in the drawings, and with inclined flanges *a a*, which are arranged opposite to each other and on each side of the cross-bar C. On the exterior of the neck of the jar are formed or arranged opposite to each other projecting points or lugs *b b*, beneath which pass the flanges *a a*, which bear against the under surfaces of the said lugs *b b* in clamping the lid of the jar on.

*c* is a small block of rubber or other elastic material, which is arranged in a depression in the under side of bar C in such manner as to project downward from said bar and come between it and the upper surface of the lid B, at the center of the latter.

The operation of the device just alluded to will be understood to be as follows, viz: After the lid B has been provided with its packing *d*, (which is arranged on it, as already explained,) it is placed on top of the jar. The clamping-bar C is then put down over the lid B, and the lowest portions of the inclined flanges *a a* placed under the lugs *b b* and the block *c*, (which is secured in the bar C,) adjusted to about the center or apex of the lid B. The clamping device, C with its inclines, is then turned (on the apex of lid B as a center of motion) until the flanges *a a*, bearing hard up against the under surfaces of lugs *b b*, cause the bar C to approach the upper surface of the lid B and force it down onto its seat on the top of the jar. It will be understood that since the pressure exerted by the bar C on the lid B is communicated through the rubber or other elastic block *c*, the lid B will be allowed to adapt itself perfectly to its seat and will not be so liable to be broken as it would be if acted upon by a rigid pressure.

It will be seen that by arranging and constructing the clamping device, as shown and described, with the inclined bearing-surfaces on each side of the cross-bar C (in lieu of either end of said bar) any springing of the bar C under strain, will have a tendency to throw the edges of the flanges *a a* slightly away from the neck or external surface of the jar instead of cramping them up against it, as would be the case were the inclined flanges *a a* arranged at either end of the bar C.

It will be understood that in addition to the principal advantages of my improved apparatus it is much more desirable to have only the points or lugs *b b* than an inclined strip or bead of glass on the jar, as in jars in which the lid was held down by a clamp with lugs operating on inclines formed on the jar.

Having fully described the invention, and not desiring to be understood as limiting it to any peculiarity of form or detail not necessary to carry out the invention, what is claimed as new, and desired to be secured by Letters Patent, is—

1. The employment, in combination with a jar having lugs *b b*, of a clamping device, which has its inclined or cam surfaces *a a* located on each side of a cross-bar, C, bearing upon the cover of the jars, the whole constructed to operate substantially as set forth.

2. In combination with a clamping device which forces the lid down onto its seat by the operation of inclined or cam surfaces, a device for effecting a yielding or elastic pressure upon the lid of the jar, substantially as and for the purposes described.

3. So forming the lid or cover B and so arranging a packing-ring, *d*, with it as that the packing will be retained in connection with the lid, substantially as hereinbefore described.

JNO. F. GRIFFEN. [L. S.]

In presence of—
J. N. McINTIRE,
M. DE LACY.